J. E. BELL.
GAS PRODUCER.
APPLICATION FILED MAR. 6, 1912. RENEWED JULY 20, 1915.

Patented Feb. 1, 1916.

J. E. BELL.
GAS PRODUCER.
APPLICATION FILED MAR. 6, 1912. RENEWED JULY 20, 1915.

1,170,496.

Patented Feb. 1, 1916.
6 SHEETS—SHEET 2.

WITNESSES
R A Balderson

INVENTOR
Jno. E. Bell.

Fig. 4.

UNITED STATES PATENT OFFICE.

JOHN E. BELL, OF NEW YORK, N. Y.

GAS-PRODUCER.

1,170,496.  Specification of Letters Patent. Patented Feb. 1, 1916.

Application filed March 6, 1912, Serial No. 681,880. Renewed July 20, 1915. Serial No. 41,013.

*To all whom it may concern:*

Be it known that I, JOHN E. BELL, a resident of New York city, in the county and State of New York, have invented a new and useful Improvement in Gas-Producers, of which the following is a full, clear, and exact description, reference being had to the accompanying drawings, forming part of this specification, in which—

My invention relates to the making of producer gas and is designed to provide an entirely new system therefor.

Among the objects of the invention are, to enable large units to be made and operated, to reduce the cost of installation, space occupied, and the cost of operation, and stand by losses; to eliminate the difficulties arising from the formation and disposal of clinker and ash; to fix the hydrocarbon gases and make gas free from tar and smoke; to increase the amount of steam which may be decomposed, and thus the amount of water gas formed; to give better control of the operation and to increase the general efficiency of the system.

In carrying out my invention, I burn granulated or pulverized fuel in suspension in an atmosphere of preheated air furnished by a regenerator or recuperator, which is heated by the outgoing gas. I preferably burn the fuel in suspension in a combustion chamber having two or more compartments, the ash being dropped during the passage from one compartment to the next. I also preferably inclose at least a part of the producer by the regenerator or regenerators. I may employ a part of the heat generated to form the steam required by the producer and to utilize the regenerator or recuperator for superheating a portion of this steam. I may also divide the steam supplied to the producer in two parts, mixing one part with the air necessary for gasifying the fuel (directing the jets so as to assist the draft) or use it to project the fuel into the producer, and add the remaining steam to the gas after combustion to reduce any carbon dioxid formed to carbon monoxid and at the same time lower the temperature of the gas entering the regenerator. The burning of the fuel while in suspension is an important feature, as it overcomes the difficulties incident to the formation of clinkers and ash. With a producer in which a fuel bed is maintained, clinkers readily form and prevent the fuel settling properly, resulting in the opening of holes or passages in the bed, through which the air, steam and gases may pass without proper decomposition or action by the hot fuel. The ash clogs the passages of the fuel bed and prevents the air and steam from having the proper intimate contact with the fuel. It is difficult to separate and hard to remove. These troubles are magnified when the temperature of the fuel bed is increased. Burning pulverized fuel in suspension produces ash and clinker in the form of dust and pellets which can be removed by centrifugal action when the resulting gas is forced to make a sharp or abrupt turn. The ash and clinker disposed of in this way will not in any manner affect the action of the producer, so that the temperature in the combustion chamber is only limited by the ability of the material forming the walls and partitions to withstand heat. The high temperature at which the reactions can take place is of advantage as it favors the formation of carbon monoxid in the combination occurring between the carbon and the oxygen furnished by the air or steam, and also insures a rapid and perfect combustion of the fuel.

Other advantages of my invention will be presented in a later part of this specification.

Figure 1:
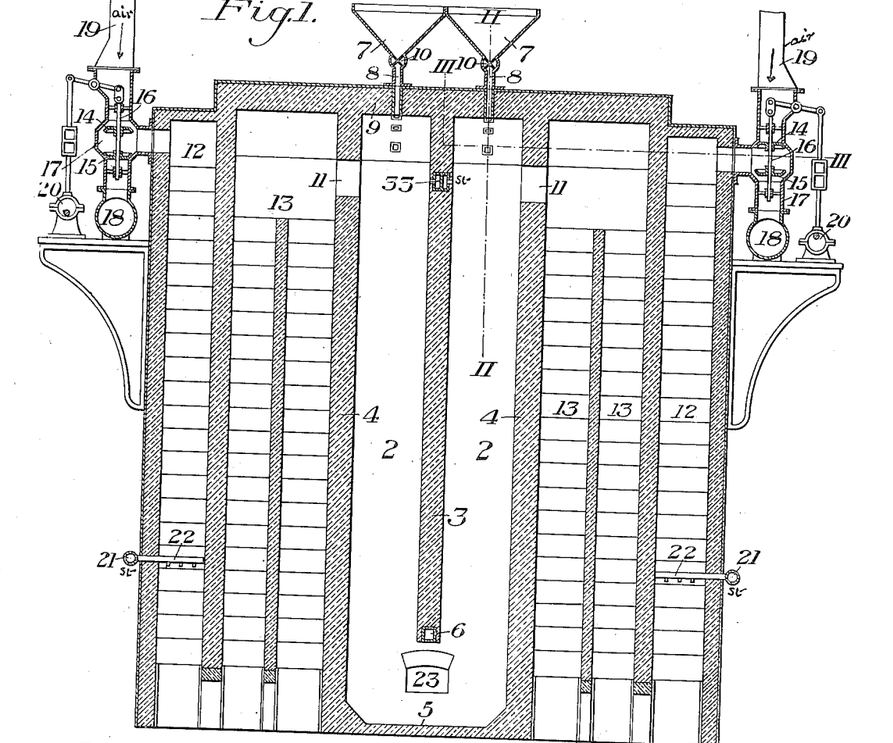
Figure 1 is a longitudinal vertical section showing one form of apparatus for carrying out my invention; where the combustion chamber is divided into two parts and the fuel drops by gravity through the producer.
Figure 2:
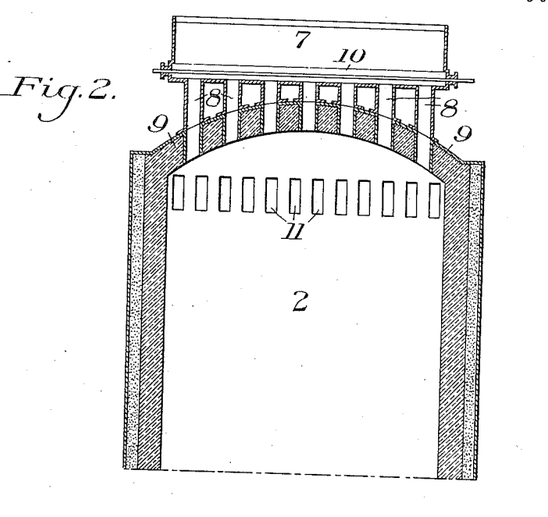
Fig. 2 is a partial vertical cross-section on the line II—II of Fig. 1.
Figure 3:
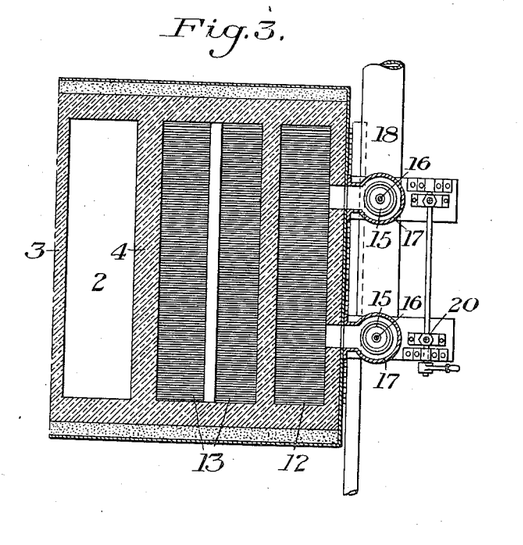
Fig. 3 is a partial horizontal cross-section on the line III—III of Fig. 1.

In the drawings, referring to the form of Figs. 1 to 3 inclusive, the combustion chamber is divided into two compartments 2—2 separated by a partition 3, shown as raised midway between the side walls 4, this partition terminating above the bottom 5 of the producer and being shown as supported at its lower end on a transverse box 6 through which water may be circulated. The granulated or pulverized fuel may be fed to either one of these chambers 2 by any desirable form of feeders which will drop the fuel in the form of a long curtain or sheet, preferably extending the length of the combustion chamber. For this purpose, I have shown a hopper 7 having a series of feed channels 8 extending therefrom through the roof 9 of the chamber, the flow through these channels being controlled by a rotary gate 10 seated within a suitably shaped lower portion of the hopper and rotated by any suitable connections. As I prefer to use regenerators in my system, I have shown two of these fuel feeders, one at the upper end of each chamber 2, which are to be used alternatively as the flow of air and gas is changed. The walls 4—4 of the combustion chamber form the inner walls of the regenerators located on each side of the chamber and connecting therewith through a series of ports 11 near the upper end of each wall 4. I have shown each regenerator as having a chamber 12, through which the entering air passes downwardly and a divided chamber 13 through which the air passes upwardly during its flow through the regenerator to the combustion chamber. These regenerator chambers may be filled with any suitable checker work material to absorb and give out heat, and may be provided with any suitable reversing valves. In the present case, I have shown two valves 14 and 15, mounted on the same vertical stem 16, these valves being mounted in chamber 17 interposed in the outlet from the regenerator to the gas flue 18. The upper valve 14 controls the air inlet through the pipe or flue 19, and I have shown the valve rod as provided with a link and lever system operated by an eccentric 20 mounted on a suitably driven shaft. The valve, however, can be operated by steam or hydraulic cylinders or other means. I have shown the chambers 12 of the regenerators as provided with headers or steam supply chambers 21, having branch supply pipes or blowers 22, one to each opening in the regenerator. Through these the main steam supply passes and mixes with the entering air. I have also shown in the wall 3 and in line with the ports 11 an auxiliary steam supply header 33 divided longitudinally by a central diaphragm and provided with a series of nozzles from each compartment directed into the adjacent ports 11.

In the operation of the apparatus during the period shown in Fig. 1, the air is entering at the left hand side passing downwardly through the chamber 12 where it is mixed with steam, the steam and air mixture passing upwardly through the two portions of chamber 13 and entering the left hand compartment of chamber 2 through the ports 11. In this chamber the mixture of heated air and superheated steam mingles with the sheet or curtain of dropping fuel which on account of the high temperature is ignited at once and burns during its passage downwardly. The ash and clinker drop out of the current during this downward pass and also during the turn into the upward pass through the other compartment, dropping to the bottom of the combustion chamber, from which they may be removed in any suitable way, through openings 23 provided with suitable closures. The auxiliary steam is injected into the gas just before it enters the right hand ports 11. At the beginning of the operation, the fuel may be ignited in any desirable manner and a sufficient quantity burned to thoroughly heat the walls of the combustion chamber and the regenerators. During this period, of course, the gases generated will be low in heat fuel and will be wasted. During the passage of the mixture through the two chambers the usual reaction takes place, the steam being decomposed and the oxygen of the air and in the steam combining with the carbon to form a combustible gas. Owing to the high temperature developed, the hydro-carbons will be rapidly driven off and changed to fixed gases. The gas, after having been somewhat cooled by the reaction between the steam from the header 30 and any carbon dioxid formed in chamber 2, passes through the upper right hand ports 11 and enters the right hand regenerator to which it will give up a large amount of its remaining heat before leaving the producer. Gradually cooling the gas in this way prevents a reversal of any of the reactions which otherwise might occur with the formation of soot and tar. At suitable intervals the flow through the producer will be reversed and the coal will be fed into the other compartment of chamber 2, the current of fuel being dropped into only one of these compartments at a time; that is the compartment receiving the hot air from the regenerators. The main steam supply will then be changed to the right hand regenerator and the auxiliary steam supply to the left hand compartment of chamber 2. On account of the heating of the air and superheating of the steam before entering the combustion chamber, the formation of carbon monoxid and the decomposition of the steam immediately begins upon contact between the powdered fuel and the air and steam. The time required to gasify a given quantity of fuel is thus greatly reduced over that of the ordinary producer, further, more steam may be used than ordinarily, as on account of the high superheat less heat is absorbed in the reaction between steam and carbon, and on account of the initial high temperature also the reactions continue during the lowering of the temperature beyond, as compared with the initial temperature, the point at which the reaction stops in the ordinary producer.

Heretofore, wherever it has been attempted to use powdered coal in a gas producer, it has been carried in by a blast of air and great difficulty has been experienced in obtaining a constant and fixed proportion between the weight of the air and the fuel with the result that the gas is not of uniform quality. In this form, the feeder, operated mechanically and independent of the air supply insures a regular and continuous feed of a predetermined amount of fuel. The amount of air passing through the producer can be exactly regulated by the draft pressure or suction, and the amount of steam admitted can be varied either as a whole or as between the main and auxiliary supply. The main supply controls the rise of temperature in the combustion chamber, and the amount of the auxiliary supply the final temperature of the gas before entering the regenerator, and subsequently the temperature of the gas leaving the producer. Each of the materials entering into the composition of the gas can thus be varied or regulated independently and at will. An additional advantage lies in the fact that the rate of formation of gas can be varied or the actual production stopped almost immediately, this being a great advantage over the old form of producer, and making it possible, even in large plants, to dispense with gas holders or accumulators. The stand-by losses are also greatly reduced, as there is no fuel bed to become chilled or clinkers to freeze. The reversals in the direction of flow of the gas through the combustion chambers and regenerators will, to a great extent, separate the dust and ash from the gas and consequently a much cleaner gas can be produced than from the ordinary form of producer. The system can be worked more economically than others, because by properly designing the regenerator, the temperature of the gas can be reduced to near that of the air supply, and the heat stored up and communicated to the entering air and steam supply.

Figure 4:
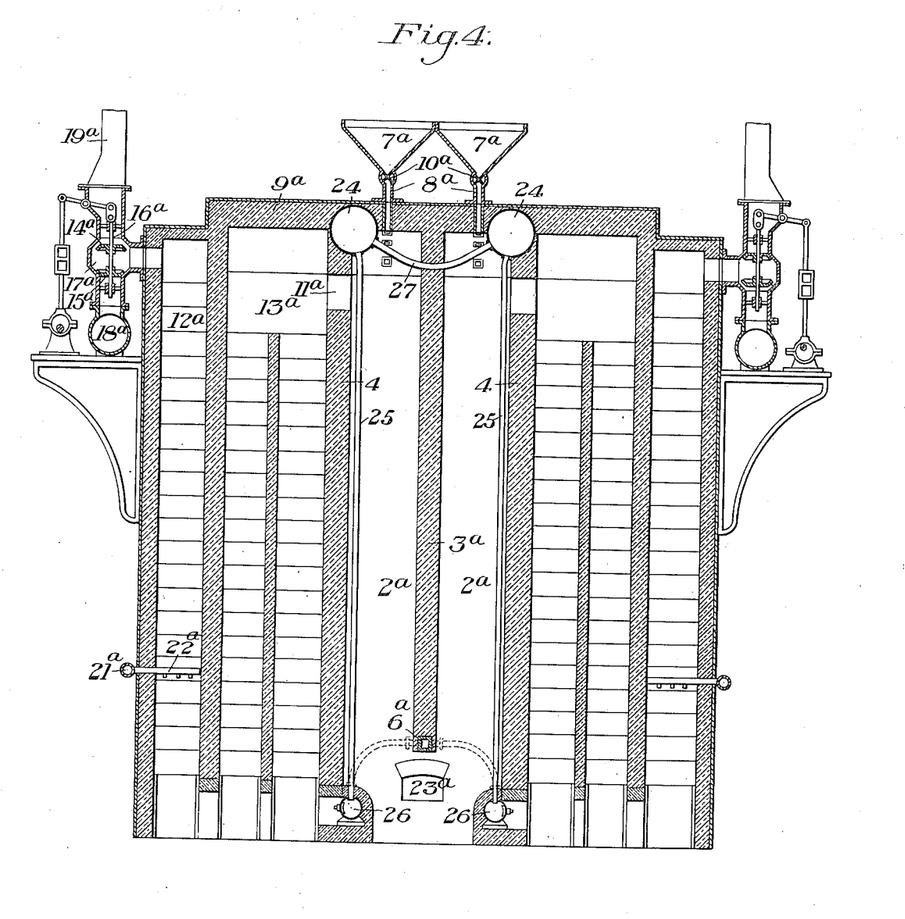
Fig. 4 is a view similar to Fig. 1, showing a modified form, and a boiler in connection.

In Fig. 4, I show an apparatus similar to that of Fig. 1, except that a water tube steam boiler is provided in connection with the producer, and forms an integral part thereof, in which I have used the same numerals with the letter "a" affixed for designating similar parts. In this form, as shown, 24 are steam and water drums extending transversely across the producer at the top of the combustion chamber at the junction of the roof and side walls 4—4; and 25 are water tubes extending downwardly in front of the walls 4, and connected to the mud drums 26. These mud drums are shown as as provided with refractory covering to protect them from the combustion chamber radiations, and from contact with the hot gas. I have shown the water spaces of the drums 24 connected by water tubes or circulators 27. The form of the boiler heating surface may be varied in many ways. The surface may be in the path of the gas or air, or the tubes may be embedded in the walls or partitions of the combustion chamber or regenerators. The surface of the boiler may be just sufficient for generating the steam required for the producer, or may be extended so as to generate additional steam which may be used for power or other purposes. I prefer a boiler of the water tube type arranged so as to receive a large amount of radiant heat from the burning fuel. Arranged in this way, the boiler surface will absorb a portion of the heat generated in the combustion of carbon to carbon monoxid, thus reducing the rise in temperature of the gas formed and permitting, where desired, a reduction in the amount of steam required by the ordinary producer.

Figure 5:
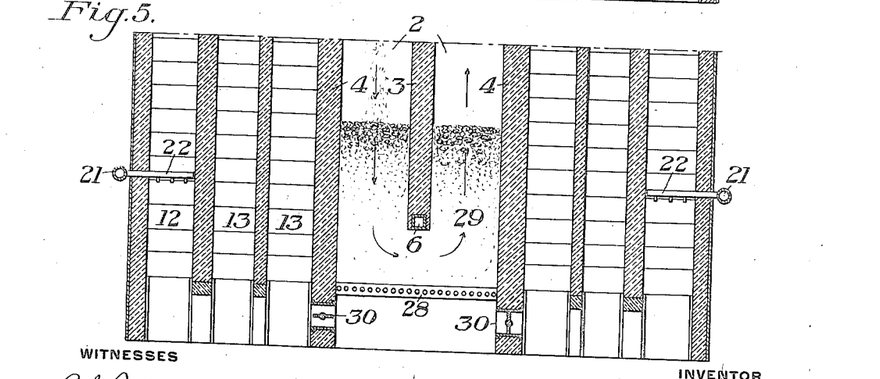
Fig. 5 is a partial section showing a modified form with a grate and bed of fuel.

Fig. 5 shows a producer of the same design as that shown in Fig. 1, with the addition of a grate 28 at the bottom of the combustion chamber 2 and over the ash pit, and with valves 30 connecting the ash pit with the chambers between passes 12 and 13 of the regenerator. In this form a fuel bed is maintained and is divided into two parts by the partition wall 3. The fuel which in this instance may be slack or small sized lumps, is dropped upon the fuel bed through the compartment of the combustion chamber into which the air from the generator is admitted (the left hand compartment in the figure) and the air, steam and gas pass down through the fuel bed around the bottom of the partition 3, and up through the fuel to the other side of the partition. The ash and clinkers are worked out through the grates in the usual way. If desired, a portion of the air or steam can be alternately admitted into the ash pit through the valves 30 and be drawn through the fuel bed in the regular manner. The reversal in the direction of the air and gas flow and the change in the fuel and steam supply are as mentioned in the description of the first form, as shown in Figs. 1, 2 and 3.

Figure 6:
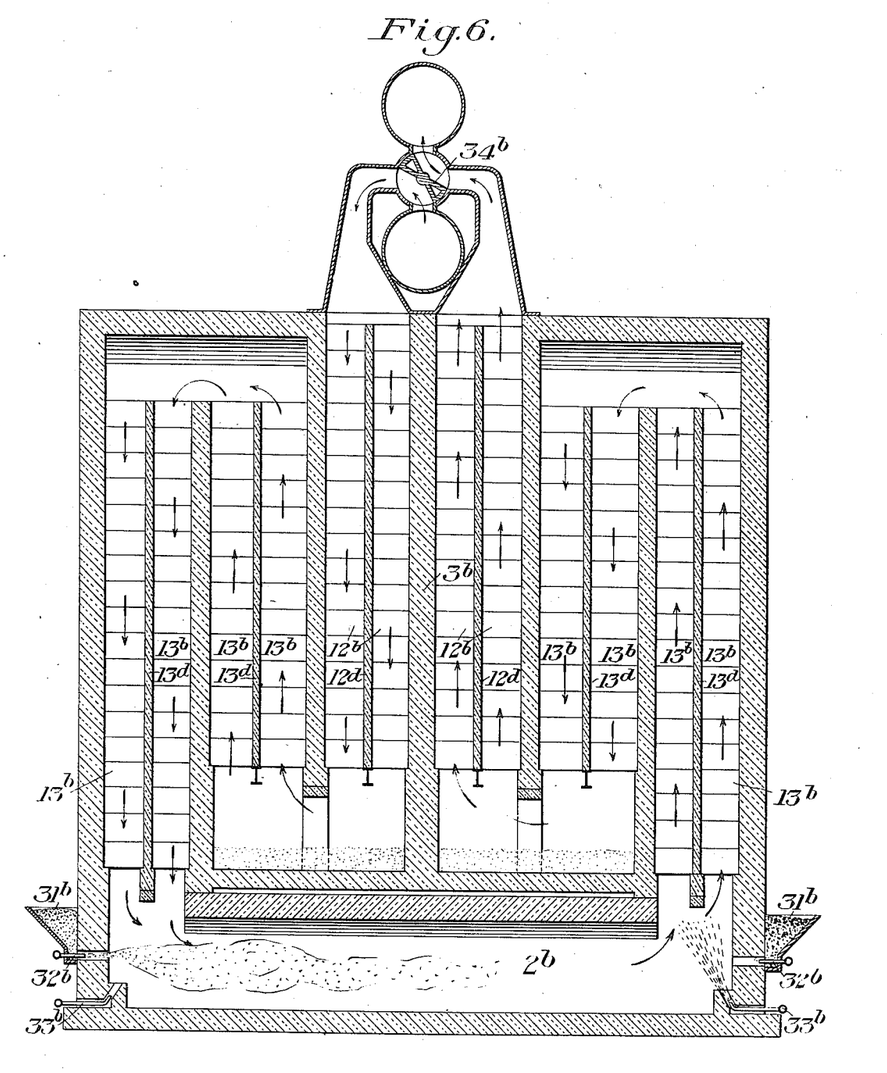
Fig. 6 is a longitudinal vertical section of another form having a single or multiple horizontal combustion chamber, into which the fuel is fed by steam jets.

In Fig. 6, I have shown another form of producer in which I have applied the same reference numerals with the letter "b" affixed. In this construction, the combustion chamber $2^b$ is horizontally disposed at the bottom of the producer, and may be divided horizontally by walls into any number of compartments, or may be filled with checker work of fire brick. Each of the chambers $12^b$ and $13^b$ are divided by walls $12^d$ and $13^d$, respectively. $31^b$ are fuel hoppers on each side of the producer, and $32^b$ are nozzles for blowing the fuel into the combustion chamber $2^b$ by air or other fluid pressure. Extending upwardly into the ends of the combustion chamber, at the junctions of said chamber and the outer chambers $13^b$, are the auxiliary steam supply pipes $33^b$. The movement of the air and gas is controlled by a butter-fly valve $34^b$ on the top of the producer. With the valve set in the position shown in Fig. 6, air is admitted to the combustion chamber $2^b$ through the left hand regenerator, and the fuel is blown into the combustion chamber from the left hand hopper $31^b$, the gas passing out through the right hand regenerator. The auxiliary steam is injected into the gas through the nozzles $33^b$ at the right hand end of the chamber $2^b$ as the gas passes into the chamber $13^b$.

Figure 7:
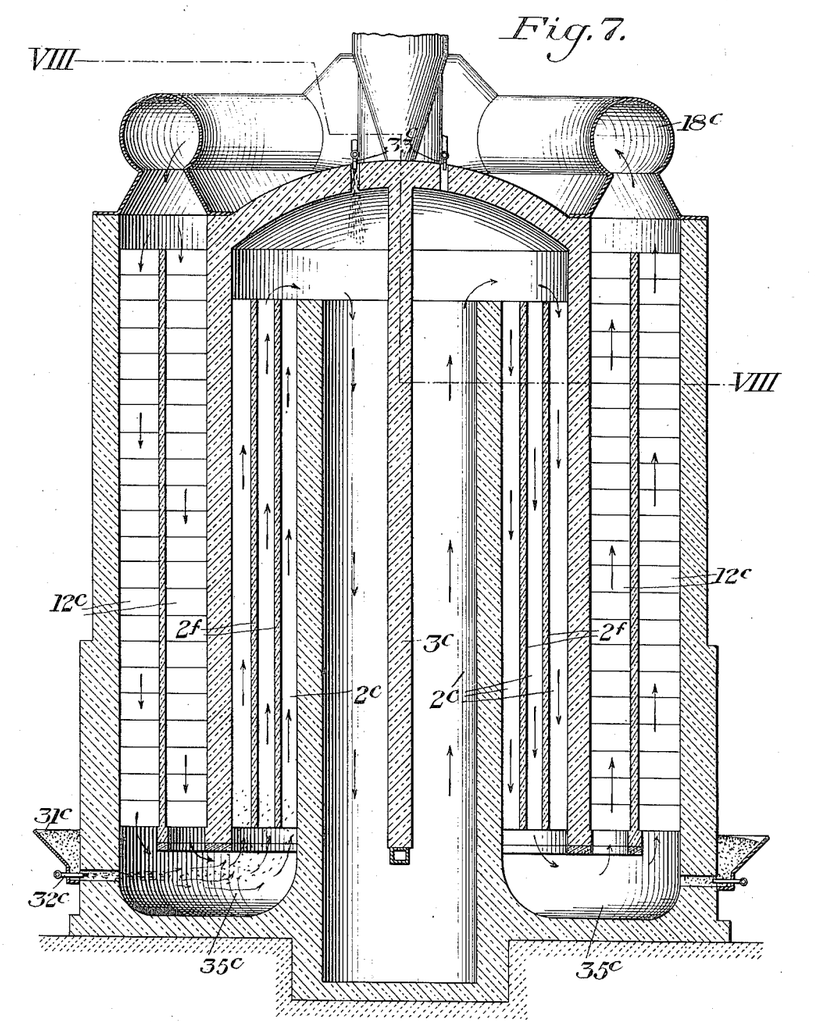
Fig. 7 is a vertical section at the center of still another form having a vertical combustion chamber divided into a number of compartments, into which the fuel is fed by steam jets to an ascending current of preheated air.
Figure 8:
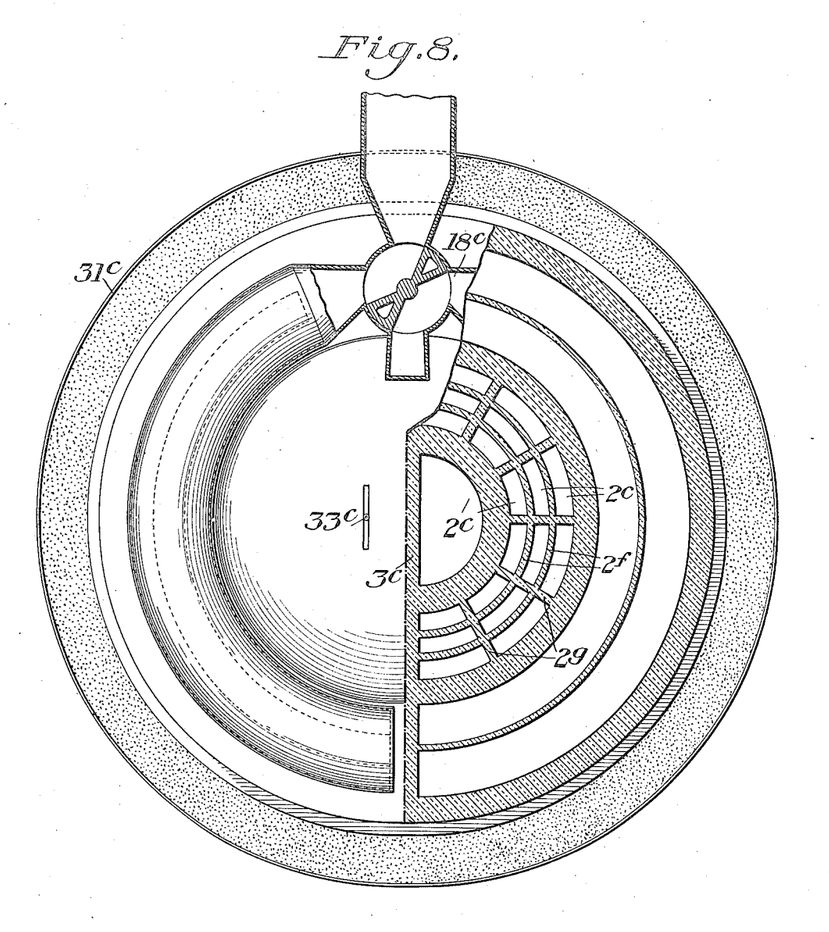
Fig. 8 is a combined horizontal section and top view along the line VIII—VIII of Fig. 7.

In Figs. 7 and 8, I have shown another form of producer in which the combustion chamber $2^c$ is vertically disposed and divided by a wall $3^c$, as in Fig. 1. In this arrangement, I have shown the producer of circular form so that the entire combustion chamber is surrounded by the regenerator. The combustion chamber $2^c$ is divided into four passes, two up and two down. The outside passes are shown subdivided into a number of compartments by a plurality of concentric walls $2^f$ and a plurality of radial walls $2^g$. The combustion of the fuel takes place in the outer passages and is assisted by the large surface of hot brick walls $2^f$ and $2^g$. The fuel is blown into the chamber $35^c$ from one of the hoppers $31^c$ by the whole or part of the steam supply or by compressed air passing through the nozzles $32^c$ and is carried into the outer compartment $2^c$, by the preheated air supplied through the chamber $12^c$. The auxiliary steam is injected into the gas as it enters the second compartment $2^c$ through the nozzle $33^c$. The gas after passing through the various chambers passes out through the chamber $12^c$ of the regenerator to the gas outlet $18^c$.

The advantages of my invention will be obvious to those skilled in the art, and have mainly been set forth in the foregoing specification. The apparatus may be built in large sized units, reducing the first cost, the cost of installation, and the cost of operation; higher temperatures of combustion may be maintained, increasing the rate of gasification, fixing the hydrocarbon gases, eliminating tar and smoke, and increasing the amount of steam that may be used or the amount of heat that can be abstracted by the use of water heating service. The temperature of the gas leaving the producer can be reduced to within a few degrees of the temperature of the atmosphere, thus increasing the efficiency. The ash and clinkers are automatically deposited by the gas and a cleaner gas is obtained. Full control of the process is provided as the steam, air and fuel may be separately and independently regulated.

I consider myself the first to provide a gas producer system wherein combustion of the fuel occurs during dropping of the fuel by gravity through a chamber, or where consumed in suspension after being projected into the producer by a steam jet; or to use water heating surfaces for absorbing the heat radiated during combustion for limiting the rise in temperature.

The fuel has been mentioned in some instances as coal; it may be, nevertheless, lignite, peat, oil, ground wood, or any other substance containing carbon and capable of gasification.

Any of the producers shown can be divided into two or more separate parts by partition walls in the combustion chambers, passage ways and regenerator, and the different parts operated, so that the air and gas flow are reversed at different times. Non-return or check valves can be placed in the gas outlet, as can also atmospheric valves arranged to open momentarily to the atmosphere at a reversal, allowing the air contained by the volume of the generator, passages and connections to escape before starting the gas to flow. The air may be supplied under pressure from a fan, or may be induced into the producer by the action of the steam jets furnishing the steam required, or may be drawn in by suction produced by a fan or blower in the gas main, or by a combination of these methods.

Many other changes and additions may be made in the form and arrangement of the apparatus, without departing from my invention.

I claim:

1. A reversing gas producer for the continuous manufacture of gas, having a single combustion chamber, in which the combination of the oxygen and carbon progresses continuously, a regenerator at least partially surrounding the chamber, means for feeding granulated or pulverized fuel to said chamber, and means for reversing the movement of the air and gas through the producer; substantially as described.

2. A reversing gas producer for the continuous manufacture of gas, having a single combustion chamber, in which the combination of the oxygen and carbon progresses continuously, a regenerator at each side of the combustion chamber, means for feeding fuel to the combustion chamber, and means for reversing the movement of air or gas through the producer; substantially as described.

3. A reversing gas producer for the continuous manufacture of gas, having a single combustion chamber, in which the combination of the oxygen and carbon progresses continuously, a regenerator connected to opposite sides of the combustion chamber, means for continuously feeding fuel to the combustion chamber, means for feeding heated air to the combustion chamber at the point of entrance of the fuel, means for reversing the movement of the air and gas through the producer, and means for injecting steam into the combustion chamber; substantially as described.

4. A reversing gas producer, having a combustion chamber, a regenerator at each side of the combustion chamber, means for continuously causing granulated or pulverized fuel to pass through the combustion chamber, means for mixing steam and air with the fuel, and means for reversing the passage of air and gas through the producer; substantially as described.

5. A reversing gas producer for the continuous manufacture of gas, having a single combustion chamber, in which the combination of the oxygen and carbon progresses continuously, a regenerator connected to each side of the combustion chamber, said regenerator chambers having a plurality of divisions formed of refractory material, means to feed air to the combustion chamber, means for feeding granulated or pulverized fuel to said chamber, the air passing through one of the regenerators, while the gas passes out of the other regenerator, and means for reversing the movement of the air and gas through the producer; substantially as described.

6. A reversing gas producer having a combustion chamber, a regenerator on each side of said combustion chamber, means for feeding a sheet of granulated or pulverized fuel to said chamber, means for directing a current of air from one of the regenerators uniformly over the width of the sheet to effect a continuous combustion of the fuel, and means for reversing the movement of the air and gas through the producer; substantially as described.

7. A reversing gas producer having a combustion chamber, a regenerator connected to each side of the combustion chamber, means for continuously feeding fuel to the combustion chamber and for mixing air and steam with the fuel in said chamber, a division wall within the combustion chamber for changing the flow from a downwardly to an upwardly direction over an ash pit at the bottom of said combustion chamber, and means for reversing the movement of the air and gas through the producer; substantially as described.

8. A gas producer having a combustion chamber in which powdered or pulverized fuel is burnt in suspension, a dividing wall within said combustion chamber, means for alternately admitting granulated or pulverized fuel to the opposite sides of said combustion chamber, and means for alternately admitting air to the opposite sides of said combustion chamber; substantially as described.

9. A reversing gas producer having a combustion chamber in which powdered or pulverized fuel is burnt in suspension, a regenerator connected to each side of the combustion chamber, means for feeding granulated or pulverized fuel to said chamber, means for feeding steam to the combustion chamber at the fuel entrance, means for feeding steam to the combustion chamber at a point beyond the fuel entrance, means for reversing the movement of the air and gas through the producer, and means for reversing the flow of fuel and steam; substantially as described.

10. A reversing gas producer having a combustion chamber in which powdered or pulverized fuel is burnt in suspension, a regenerator at least partially surrounding the chamber, means for feeding granulated or pulverized fuel to said chamber, means for reversing the movement of the air and gas through the producer, and means for injecting steam into the air as it passes into the chamber.

11. A reversing gas producer having a combustion chamber in which powdered or pulverized fuel is burnt in suspension, a regenerator at least partially surrounding the chamber, means for feeding fuel to said chamber, there being an air inlet and a gas outlet for the producer, means for reversing the movement of the air and gas through the producer, and means for injecting steam into the air as it passes into the chamber, together with means for injecting steam into the gas as it leaves the combustion chamber.

12. A gas producer having a combustion chamber, a dividing wall within said combustion chamber, means for alternately admitting fuel to the opposite sides of said combustion chamber, means for alternately admitting air to the opposite sides of said combustion chamber, and a steam generator within said combustion chamber, arranged to absorb the heat radiated during combustion of the fuel, substantially as described.

13. A reversing gas producer having a combustion chamber, a regenerator connected to each side of the combustion chamber, means for feeding granulated or pulverized fuel to said chamber, means for reversing the movement of air and gas through the producer, a steam generator within the combustion chamber arranged to absorb the heat radiated during combustion and thereby limiting the rise in temperature, means for feeding steam from the generator to the combustion chamber at a point beyond the fuel entrance, and means for reversing the flow of fuel and steam; substantially as described.

14. A reversing gas producer, having a combustion chamber, a regenerator at each side of the combustion chamber, means for continuously causing granulated or pulverized fuel to pass through the combustion chamber, means for mixing steam and air with the fuel, means for reversing the passage of air and gas through the producer, and means for reversing the movement of the fuel through the combustion chamber; substantially as described.

In testimony whereof, I have hereunto set my hand.

JOHN E. BELL.

Witnesses:
J. R. HALLIGAN,
J. H. RITCH.